UNITED STATES PATENT OFFICE.

ROBERT D. GATES, OF PHILADELPHIA, PENNSYLVANIA, ASSIGNOR OF FIFTY-ONE ONE-HUNDREDTHS TO HENRY S. BURBANK, OF SAME PLACE.

COMPOSITION FOR WATERPROOFING AND PRESERVING BRICK WALLS, &c.

SPECIFICATION forming part of Letters Patent No. 533,883, dated February 12, 1895.

Application filed October 29, 1894. Serial No. 527,101. (No specimens.)

*To all whom it may concern:*

Be it known that I, ROBERT D. GATES, a citizen of the United States, residing at the city of Philadelphia, in the county of Philadelphia and State of Pennsylvania, have invented certain new and useful Improvements in Compositions for Waterproofing and Preserving Brick Walls and other Structures, of which the following is a specification.

My invention has relation to the preparation of a liquid composition for water-proofing and preserving brick-walls and other structures.

The principal objects of my invention are, first, to provide an inexpensive, durable and effective liquid composition or compound for renovating brick, plaster and stone-walls or other structures by coating the same therewith, for removing as well as preventing the appearance of a substance known as "white mold" on brick buildings through atmospheric conditions by reason of the affinity it has therefor and attracting the same to such an extent to the exterior surface of the bricks as to stain or disfigure the same; second, to provide a liquid composition which in application to new brick work is adapted to thoroughly water-proof the same as well as prevent mold or stain gathering upon the exterior surface thereof; third, to provide a liquid composition or paint adapted for application to the surface of plaster or stone-walls to so penetrate the same as to keep dampness or mold from appearing on the face thereof, and, fourth, to provide a liquid composition for water-proofing and preserving brick walls and other structures, having suitable coloring matter applied thereto for insuring the required color, tint or shade being given to the wall or other structure and to prevent mold or dampness appearing through the applied coating, paint or dye to the structure.

My invention consists of a liquid composition for water-proofing and preserving walls or other structures compounded substantially as hereinafter described and claimed.

The nature and scope of my invention will be more fully understood from the following description of one mode of carrying my invention into effect.

I take forty-four (44) gallons of crude or refined petroleum, which may be of a specific gravity of 43.52° and to which I add five (5) pounds of crude turpentine, dissolved by heat in three (3) gallons of linseed oil or benzine, with preference given to benzine. I then add two and one-half (2½) pounds of wild cherry gum, dissolved in alcohol and three (3) gallons of channel cement composed of ground hoof and foot sinew of cattle or other animals and crude rubber or caoutchouc mixed or thinned with benzine. The above liquid composition is heated to near a boiling point, for a short period of time, and it is then filtered through slaked lime, in order to purify and render the same so that it will readily permeate the pores of brick, stone or other walls as well as dry into and onto the same.

It may be here remarked that the proportions hereinabove mentioned may be varied somewhat from those given and equally good results be obtained.

To the above composition may be added, if desired, suitable coloring matter, in powder form as Venetian red, burnt umber or iron rust to give the required color or tint to the liquid compound or composition, for application to stained bricks or other structures. This is desirable, when the wall is very generally blackened, stained or white mold has gathered thereon to such an extent as to become deeply set in the pores or body as well as the surface of the brick of the wall and hard mortar between the same.

Among the advantageous features of my invention may be mentioned this fact, that the liquid composition thereof is very inexpensive as well as effective in its application to brick and other walls for not only thoroughly water-proofing the same, but also for removing stain and preventing the appearance or return of mold gathering thereon at certain seasons of the year, due to atmospheric conditions, calculated to disfigure and render unsightly handsome buildings. The material composition of the compound hereinbefore described prevents any such deleterious results by insuring the presence at all times of a brick or other wall in a natural color or condition and in a dry state.

Having thus described the nature and ob- jects of my invention, what I claim as new, and desire to secure by Letters Patent, is—

1. A water-proofing and preserving composition, composed of petroleum, turpentine, gum and channel cement, substantially as described.

2. A water-proofing and preserving liquid composition, composed of petroleum, turpentine, wild cherry gum, channel cement and coloring matter, substantially as and for the purposes described.

In testimony whereof I have hereunto set my signature in the presence of two subscribing witnesses.

ROBERT D. GATES.

Witnesses:
J. WALTER DOUGLASS,
THOMAS M. SMITH.